United States Patent
Exton et al.

(10) Patent No.: US 9,852,654 B2
(45) Date of Patent: Dec. 26, 2017

(54) LEARNING AID

(71) Applicant: John Exton, Mitcham, Victoria (AU)

(72) Inventors: John Exton, Mitcham (AU); George Kotsiopoulos, Ferntree Gully (AU)

(73) Assignee: John Exton, Mitcham, Victoria (AU)

( * ) Notice: Subject to any disclaimer, the term of this patent is extended or adjusted under 35 U.S.C. 154(b) by 237 days.

(21) Appl. No.: 14/434,355

(22) PCT Filed: Sep. 30, 2013

(86) PCT No.: PCT/AU2013/001105
§ 371 (c)(1),
(2) Date: Apr. 8, 2015

(87) PCT Pub. No.: WO2014/056018
PCT Pub. Date: Apr. 17, 2014

(65) Prior Publication Data
US 2015/0262508 A1  Sep. 17, 2015

(30) Foreign Application Priority Data

Oct. 10, 2012 (AU) ............................... 2012904419
May 27, 2013 (AU) ............................... 2013901883

(51) Int. Cl.
*G09B 19/02* (2006.01)
*G09B 1/14* (2006.01)

(52) U.S. Cl.
CPC .............. *G09B 19/02* (2013.01); *G09B 1/14* (2013.01)

(58) Field of Classification Search
USPC .............. 434/188, 191, 200, 202, 203, 215; 116/222, 225; 235/123, 127
See application file for complete search history.

(56) References Cited

U.S. PATENT DOCUMENTS

| | | | | |
|---|---|---|---|---|
| 576,017 A | * | 1/1897 | Zierfuss | A63F 1/18 116/223 |
| 797,800 A | * | 8/1905 | Field | A63F 1/18 235/127 |
| 1,489,028 A | * | 4/1924 | Fishel | A63F 1/06 235/127 |
| 1,803,265 A | * | 4/1931 | Mallard | A63F 7/305 273/127 R |
| 2,541,423 A | * | 2/1951 | Kirtogian | G06G 1/0005 116/223 |

(Continued)

FOREIGN PATENT DOCUMENTS

CN  2061315 U  8/1990
CN  2828967 Y  10/2006

(Continued)

OTHER PUBLICATIONS

Examination Report dated Oct. 23, 2015 for corresponding New Zealand Application No. 628315.

(Continued)

*Primary Examiner* — Kurt Fernstrom
(74) *Attorney, Agent, or Firm* — David D. Brush; Westman, Champlin & Koehler, P.A.

(57) ABSTRACT

A learning aid including a series of symbols and movable portions. Each of the movable portions is associated with at least one of the symbols and is movable by hand from a first position to a second position to select the at least one of the symbols.

16 Claims, 6 Drawing Sheets

(56) References Cited

U.S. PATENT DOCUMENTS

| | | | | | |
|---|---|---|---|---|---|
| 2,770,209 | A | * | 11/1956 | Niclaus | G09F 7/00 |
| | | | | | 116/325 |
| 2,987,827 | A | * | 6/1961 | Carnegie, Sr. | G09B 19/02 |
| | | | | | 434/202 |
| 3,349,202 | A | | 10/1967 | Beer | |
| 3,456,948 | A | * | 7/1969 | Bosco | H01H 1/66 |
| | | | | | 273/270 |
| 3,694,932 | A | * | 10/1972 | McGrath | G09B 19/02 |
| | | | | | 434/202 |
| 4,045,013 | A | * | 8/1977 | Coster | A63B 71/0672 |
| | | | | | 116/222 |
| 4,445,864 | A | | 5/1984 | Price | |
| 4,560,354 | A | | 12/1985 | Fowler | |
| 4,793,492 | A | | 12/1988 | Halbich | |
| 5,311,834 | A | * | 5/1994 | Ross | A63F 3/065 |
| | | | | | 116/234 |
| 5,536,170 | A | | 7/1996 | Murphy | |
| 6,264,199 | B1 | | 7/2001 | Schaedel | |
| 6,884,077 | B2 | * | 4/2005 | Faulkner | G09B 19/02 |
| | | | | | 434/188 |
| 6,964,110 | B2 | | 11/2005 | Shapiro | |
| 7,534,106 | B1 | * | 5/2009 | Dutcher | G09B 19/02 |
| | | | | | 434/188 |
| 7,771,200 | B2 | * | 8/2010 | Schultz | A63F 1/04 |
| | | | | | 434/188 |
| 7,828,553 | B2 | * | 11/2010 | Baerg | G09B 1/14 |
| | | | | | 434/203 |
| 8,438,744 | B1 | * | 5/2013 | Mann | G01B 3/002 |
| | | | | | 33/491 |
| 2004/0251165 | A1 | | 12/2004 | Girzaitis | |

FOREIGN PATENT DOCUMENTS

| | | | |
|---|---|---|---|
| CN | 101409164 | A | 4/2009 |
| GB | 2458652 | A | 3/2008 |
| GB | 2458652 | A | 9/2009 |

OTHER PUBLICATIONS

"Origami Fortune Teller", published on Dec. 15, 2006 (from Waybackmachine). https://web.archive.org/web/20061215065420/http://www.dltk-kids.com/world/japan/mfortune-teller.htm.
Examination Report dated Dec. 11, 2015 for corresponding New Zealand Application No. 628315.
"A Steno Pad for My Thoughts—The Blank Advent Calander" Published on Nov. 29, 2007 (from Waybackmachine). https://web.archive.org/web/20071201061117/http://thesmallobject.com/stenopad/wordpress/?p=868.
English translation of Chinese Office Action dated Nov. 2, 2016 for corresponding Chinese application No. 2013800532327.
Australian Search Report and Written Opinion dated Feb. 15, 2013 for corresponding Australian Application No. 2012904419, filed Oct. 10, 2012.
International Search Report dated Nov. 8, 2013 for corresponding International Application No. PCT/AU2013/001105, filed Sep. 30, 2013.
International Preliminary Report on Patentability dated Jan. 27, 2015 for corresponding International Application No. PCT/AU2013/001105, filed Sep. 30, 2013.
Examination Report dated Sep. 29, 2015 for corresponding New Zealand Application No. 628315.
Examination Report dated Aug. 4, 2015 for corresponding New Zealand Application No. 628315.

* cited by examiner

FIGURE 15

LEARNING AID

CROSS-REFERENCE TO RELATED APPLICATIONS

This Application is a Section 371 National Stage Application of International Application No. PCT/AU2013/001105, filed Sep. 30, 2013, the content of which is incorporated herein by reference in its entirety, and published as WO 2014/056018 on Apr. 17, 2014, in English.

FIELD

This invention relates to improvements in and for learning (and teaching) and learning aids.

The invention will be described with reference to an exemplary learning aid including a series of Western numerals, although various examples of the invention may relate to other series of symbols.

BACKGROUND

When teaching the elementary principles of numbers and counting, it is useful to have objects, referred to as "concrete learning aids", which the student can touch and feel when developing a link between the abstract concepts of numbers and counting and the physical world. Popular concrete learning aids include small blocks, rods and larger cubes. The small blocks are 1 cm×1 cm×1 cm cubes and are notionally assigned a value of 1. The rods are 1 cm×1 cm×10 cm rectangular prisms scored at 1 cm spacings along their length and represent a value of 10. The larger cubes are 10 cm×10 cm×10 cm with each of their major faces scored with a perpendicular grid having a pitch of 1 cm. These larger cubes represent a value of 1000.

Such blocks are sold under the trade marks MAB, CENTICUBES and CUISENAIRE. Using these blocks, students may align 10 of the small blocks in a row and see that they are equivalent to a rod. Equally, students may align seven blocks in a row and place that row alongside a rod to begin forming the concept that 7+3=10.

Despite their popularity, such learning aids have significant drawbacks. The smaller blocks are choking hazards and are prone to being lost. Much of a teacher's time is wasted packing and unpacking blocks.

Various aspects of the invention aim to provide improvements in and for learning aids, or at least provide alternatives for those concerned with teaching and/or learning.

It is not admitted that any of the information in this patent specification is common general knowledge, or that the person skilled in the art could be reasonably expected to ascertain or understand it, regard it as relevant or combine it in any way at the priority date.

SUMMARY

One aspect of the invention provides a learning aid including
 a series of symbols; and
 an integral body of material;
 wherein
  two or more portions of the integral body are movable; and
  each of the movable portions is associated with at least one of the symbols and is movable by hand from a first position to a second position to select the at least one of the symbols.

Another aspect of the invention provides a learning aid including
 a series of symbols; and
 movable portions;
 wherein each of the movable portions
  is associated with at least one of the symbols;
  is mounted to span a gap at least partly through which it is movable by hand from a first position to a second position to select the at least one of the symbols; and
  has a free length longer than the gap, through which it is movable, to form an over-centre arrangement separating the first position from the second position.

Preferably the learning aid has an over-centre arrangement configured to drive the movable portion from a centre towards the first position and the second position.

Another aspect of the invention provides a learning aid including
 a series of symbols; and
 movable portions;
 wherein each of the movable portions
  is associated with at least one of the symbols;
  is movable by hand from a first position to a second position to select the at
  least one of the symbols; and
  has an integral hinge.

Another aspect of the invention provides a lesson set including
 a learning aid; and
 a sheet of material;
 the sheet of material including a sheet portion and another sheet portion;
 the sheet portion carrying a series of symbols and being separable from the other sheet portion;
 the other sheet portion carrying information complementary to the symbols carried by the sheet portion;
 the learning aid including movable portions;
 each of the movable portions being associable with at least one of the symbols and movable by hand from a first position to a second position to select the at least one of the symbols Another aspect of the invention provides a sheet of material for use with a learning aid;
 the sheet of material including a sheet portion and another sheet portion;
 the sheet portion carrying a series of symbols and being separable from the other sheet portion;
 the other sheet portion carrying information complementary to the symbols carried by the sheet portion;
 the learning aid including movable portions;
 each of the movable portions being associable with at least one of the symbols and movable by hand from a first position to a second position to select the at least one of the symbols.

Preferably the sheet portion when separated is a strip. Optionally the sheet of material may include at least one marking indicating the position of a boundary between the sheet portion and the other sheet portion. More preferably the sheet of material includes at least one line of weakness along which the sheet may be torn to separate the sheet portion from the other sheet portion.

The learning aid may include two or more of the integral bodies. Optionally a chassis to carry the integral bod(y/ies) is provided, which chassis is preferably in substance formed of a different material to the integral bod(y/ies).

Another aspect of the invention provides a learning aid including
 a series of symbols; and movable portions;

wherein each of the movable portions is associated with at least one of the symbols and is movable by hand from a first position to a second position to select the at least one of the symbols.

The learning aid preferably includes an over-centre arrangement separating the first position and the second position, in which case it is preferred that each of the movable portions spans a gap and is mounted to be pushed at least partly through the gap from one of the first position and the second position to the other of the first position and the second position. By way of example, each movable portion may include two panels hingedly connected to each other and to structure defining the gap.

The learning aid may include a piece carrying the or further symbols and being replaceable by another piece carrying other symbols to move the other symbols into association with the movable portions.

Another aspect of the invention provides a learning aid including a series of symbols;

at least one portion movable by hand to select at least one of the symbols; and a piece carrying the or further symbols and being replaceable by another piece carrying other symbols to be selected.

According to the various aspects the piece may be a strip. By way of example, the strip may be receivable within a channel of the learning aid. The other symbols may be together a series of fractions. Preferably the series of symbols convey at least the integer numbers from 1 to 9 inclusive, or more preferably 0 to 9 inclusive.

The symbols may be Western numerals. The learning aid may be a ruler.

Preferably the movable portions are portions of a common integral body of material, e.g. a body of plastic.

Novel methods of teaching and learning are also disclosed.

BRIEF DESCRIPTION OF DRAWINGS

The figures illustrate examples of the invention.

FIG. 15 illustrates a lesson plan.

DESCRIPTION OF EMBODIMENTS

Figure 1:
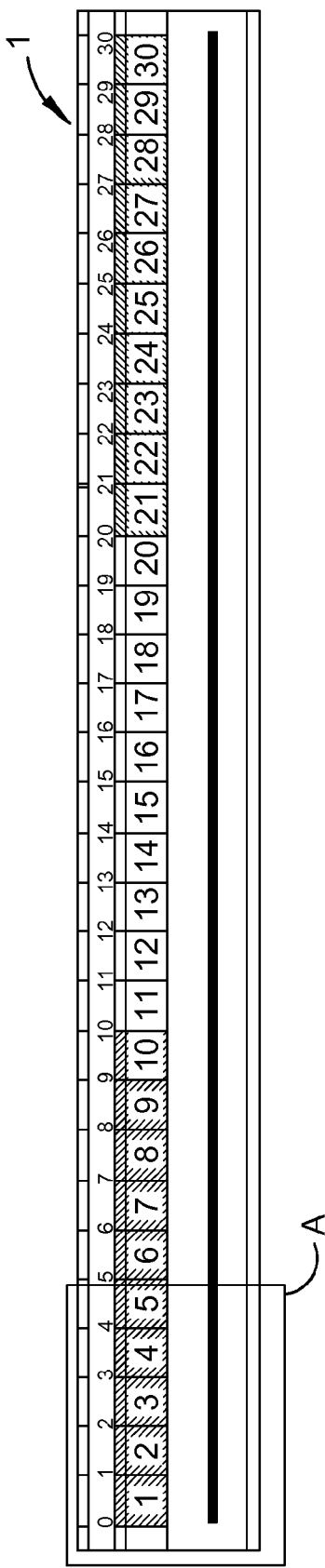
FIG. 1 is a top view of a learning aid.
Figure 2:
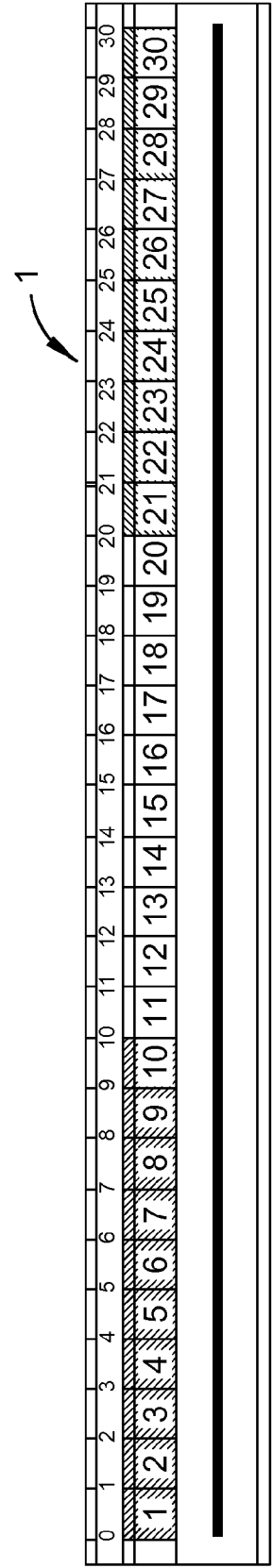
FIG. 2 is a plan view of a blank for forming the learning aid.
Figure 3:
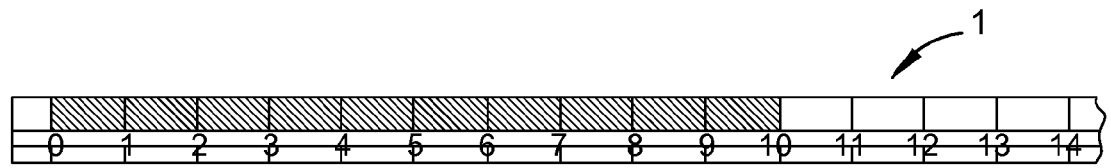
FIG. 3 is a front view of the learning aid.
Figure 4:
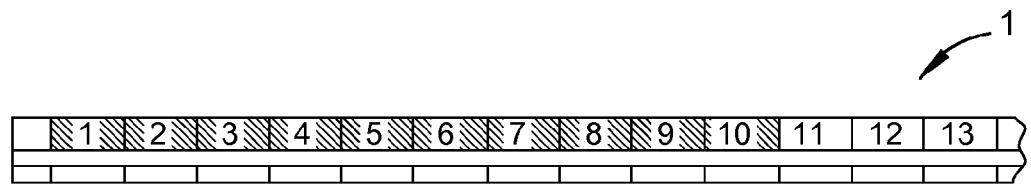
FIG. 4 is a back view of the learning aid.
Figure 5:
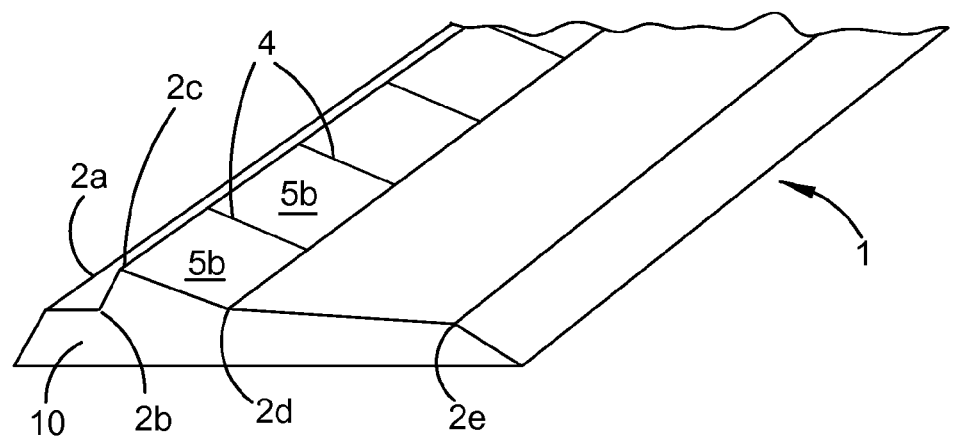
FIG. 5 is a perspective view of an end portion of the learning aid.
Figure 6:
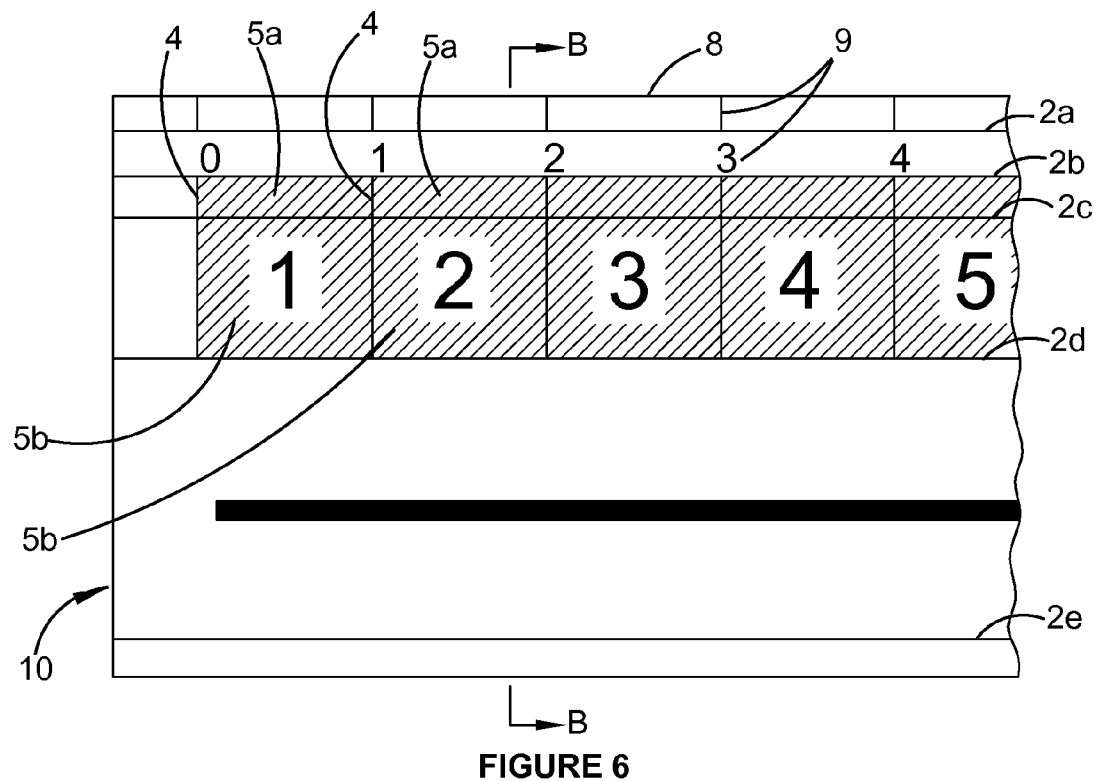
FIG. 6 is an enlargement of detail A in FIG. 1.

The exemplary learning aid 1 takes the form of a ruler. It is predominantly formed from a blank cut from a planar sheet of plastic (FIG. 2) and folded along fold lines 2a, 2b, 2c, 2d and 2e running along its length. This long shape is capped at its ends by vertical planar pieces 10.

The fold lines 2b, 2c and 2d define elongate planar portions 3a, 3b making up a ridge running along the ruler. Fold line 2c forms the vertex of the ridge. The ridge 3a, 3b is divided into segments by slots 4. Each slot 4 runs, in a direction transverse to the length of the ruler, from fold line 2b to fold line 2d. The slots 4 are spaced at a pitch of 1 cm along the ruler. In other examples of the aid the slots may be spaced by other formal units, such as imperial units, or informal units; e.g. the slots may be spaced by inches, half inches, finger spacings or match box lengths. 12 one-inch spacings or 24 half-inch spacings would be convenient.

The slots 4 divide the ridge 3a, 3b into pairs of panels 5a, 5b. Portion 3a is divided into panels 5a. Portion 3b is divided into panels 5b. Each panel 5b carries a respective symbol of a series such that the portions 5b together display a series of symbols. In this example the series is the integer numbers 1 to 30 (i.e. 1 to 30 in increments of 1) in Western numerals. Of course, other symbols (e.g. Roman numerals) and series (e.g. 2, 4, 6 . . . or 10, 20, 30 . . .) are possible.

The panels 5a, 5b of each pair together have a free length larger than a gap 6, between fold lines 2b, 2d, that they span. The plastic material is selected such that the fold lines 2b, 2c, 2d are sufficiently pliable to form hinges. This construction is sometimes referred to as an integral hinge.

Each panel 5b can be thought of as a button. By pressing the panel 5b downwardly from its first, raised, position of FIG. 7, the panels 5a, 5b can be moved downwardly to a second, low, trough-like position of FIG. 8. It will be appreciated that each panel pair 5a, 5b can be individually actuated independently of the other panel pairs.

This pushing action is a form of manipulation by hand and provides a concrete, tangible learning experience. The positioning of a portion 5a, 5b in its second, lower, position of FIG. 8 visually displays the number carried by that movable portion 5a, 5b. Thus the exemplary learning aid allows for individual symbols of the series to be selected by pushing down on the appropriate movable portion 5a, 5b, and for those symbols to be stored whilst that portion 5a, 5b remains in its downward position. Other examples of movable portions may include toggles and/or switches.

Figure 7:
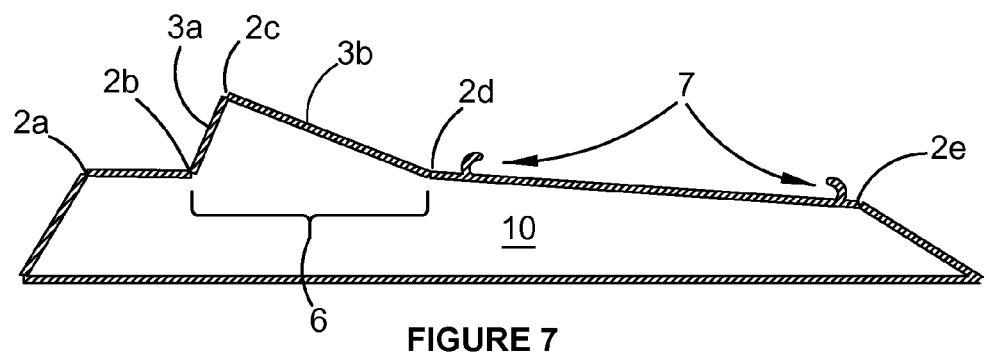
FIG. 7 is an end view of the learning aid.
Figure 8:
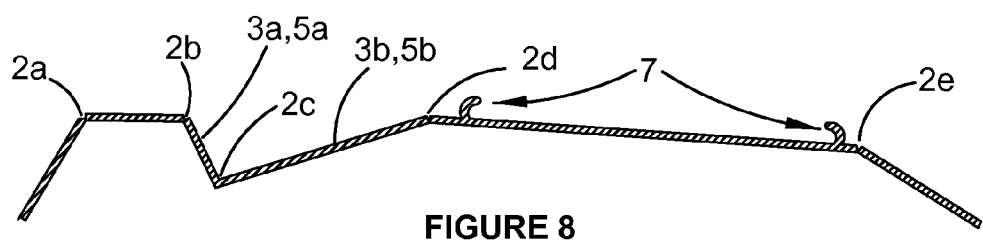
FIG. 8 is a cross-section view corresponding to the line B-B in FIG. 6.

To deselect a selected symbol, the portion 5a, 5b may be pushed from an underside of the learning aid to move it upwardly from the position of FIG. 8 to the position of FIG. 7. Of course, the operating sequence could be reversed; a number might be selected by pushing up on the movable portion 5a, 5b.

As the panels 5a, 5b are longer than the gap 6, moving them through the gap, from the orientation of FIG. 7 to the orientation of FIG. 8, entails resiliently deforming the plastics material of the learning aid until the panels 5a, 5b reach a centre point at which the resilience of the material drives the panels 5a, 5b towards the lowered position. Thus the illustrated arrangement constitutes an over-centre arrangement separating the first position of FIG. 7 from the second position of FIG. 8.

This exemplary over-centre arrangement provides a simple, cost-effective means to ensure that the selected positions are retained. Other over-centre arrangements are possible. By way of example, a simple flap mounted to pivot about a horizontal axis may be moved over the pivot axis between first and second positions. Indeed, workable variants of the learning aid may not include an over-centre arrangement. By way of example, a movable portion may simply be held in place by friction.

Whilst it is preferred that the movable portions carry the symbols, in other examples of the learning aid they may simply sit adjacent to, or otherwise be associated with, the movable portions. The learning aid 1 may incorporate structure 7 (FIGS. 7 and 8) defining a channel running along the aid to receive a strip of material, e.g. paper, carrying further symbols which may be brought into association with the movable portions 5a, 5b. By way of example, a strip of material carrying the symbols 10, 20, 30, etc, spaced at a pitch of 1 cm, may be inserted.

In other variants of the aid, the body of material may be slid under a sheet of transparent material of the learning aid. It is contemplated that the inserted strip of material could be tailored from lesson to lesson. For example, different strips could be used for different lesson foci, such as decimals, fractions, scale, other number base systems and basic number facts.

The learning aid 1 is desirably dimensioned to fit within a student's pencil case so that it may be conveniently carried. Indeed, the learning aid can replace a conventional ruler. For this purpose, the aid has a ruling edge 8 along one of its long sides with the appropriate ruling markings 9 along that edge.

An advantage of this construction is that selected ones of the movable portions 5a, 5b may be depressed to form finger-engaging recesses to allow the ruler to be more easily and conveniently maneuvered across the page. By way of example, the ruler may be manipulated by these finger-engaging portions so that one of its long sides engages the spine of an exercise book whilst the other long edge 8 is appropriately positioned for ruling a margin, thus reducing another waste of classroom time.

It will be appreciated that this exemplary learning aid may replace the described concrete learning aids at least for certain lesson types, although this exemplary aid is also configured to co-operate with existing concrete learning aids. Each panel pair 5a, 5b is dimensioned to receive and stably retain one of the small blocks. By way of example, the portions 5a, 5b numbered 1 to 13 may be depressed and a 10-unit rod placed across the depressed portions to illustrate that 10+3=13.

Figure 9:
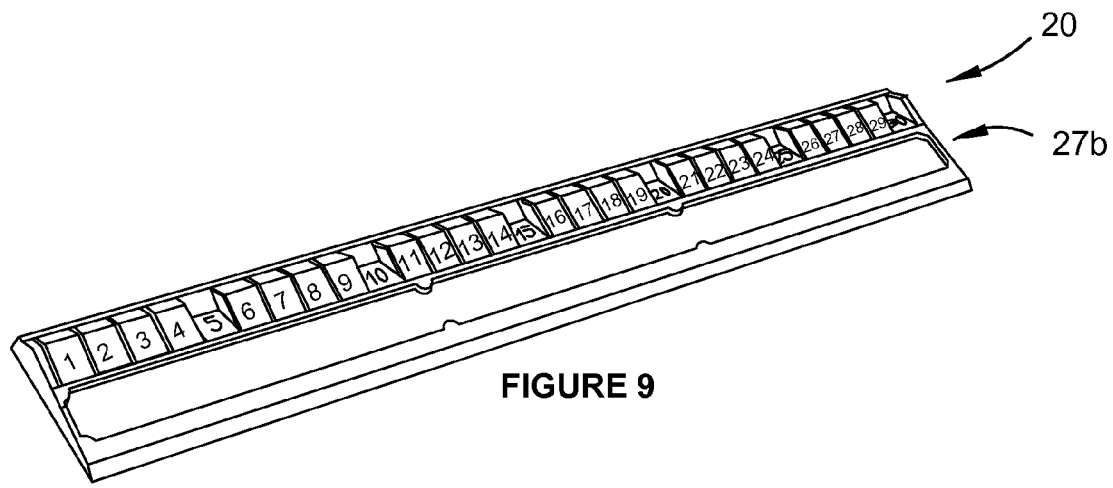
FIG. 9 is a perspective view of another ruler.
Figure 10:
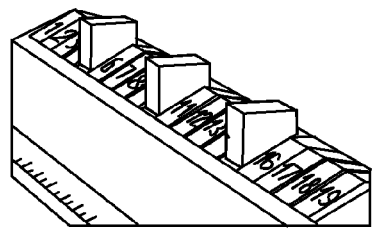
FIG. 10 is a perspective view of the ruler of FIG. 9 carrying blocks.
Figure 11:
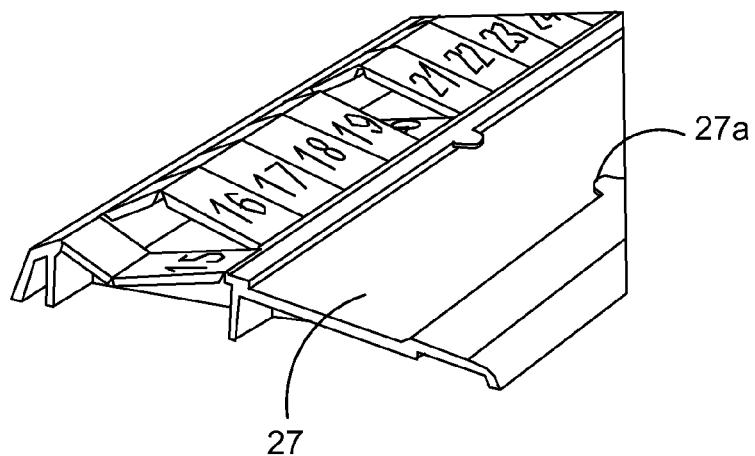
FIG. 11 is a cut-away perspective view of the ruler of FIG. 9.

FIGS. 9 to 11 illustrate another ruler predominantly consisting of a single integral body of material.

In the ruler 20 the strip-retaining formation takes the form of a shallow upwardly-open channel 27. Portions configured to overlie the strip, in the form of short half-circular tabs 27a, are spaced along the ruler. One end of the channel 27 opens through an end wall of the ruler at port 27b such that a strip of material may be slid lengthwise into the channel 27 to move symbols carried by the strip into association with the ruler's movable portions.

FIG. 10 shows selected movable portions depressed to form block-receiving seats, each of the seats carrying a respective block.

Figure 12:
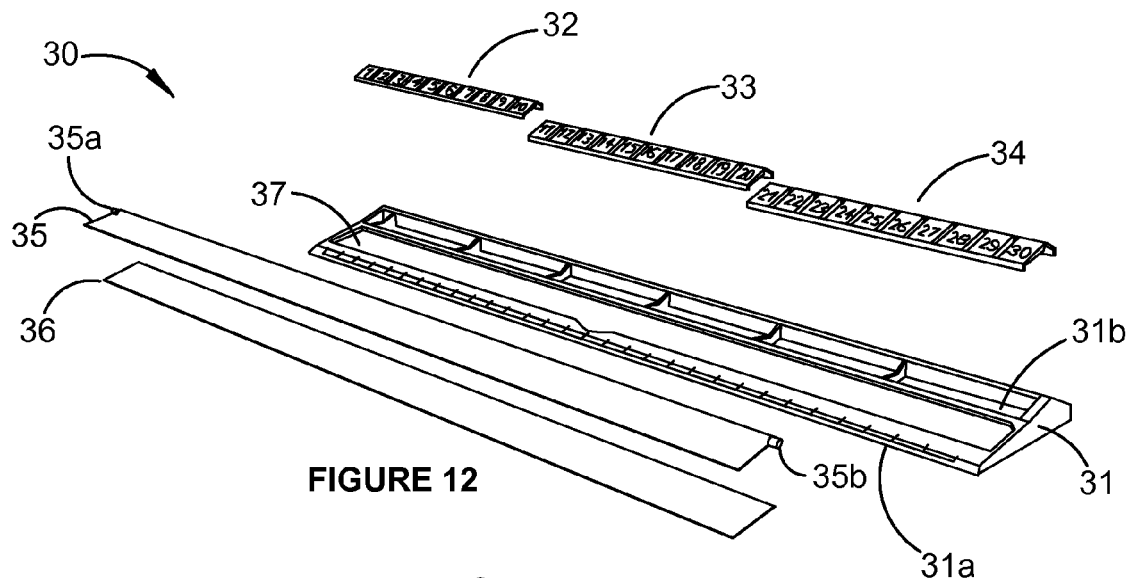
FIG. 12 is an exploded view of another ruler.
Figure 13:
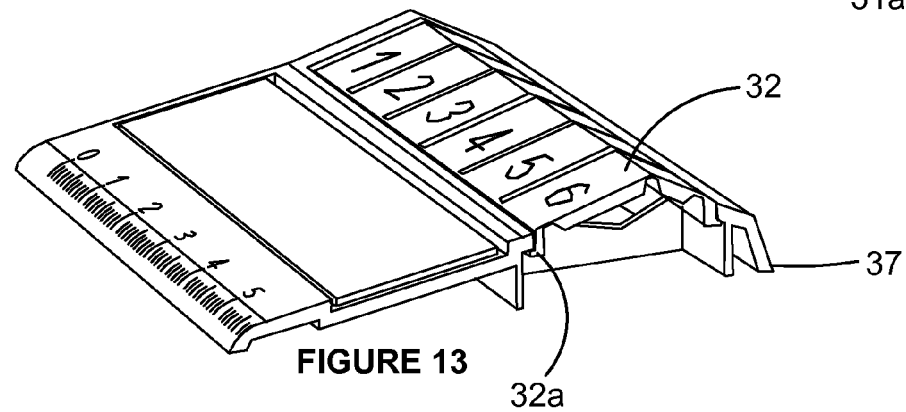
FIG. 13 is a cut-away perspective view of the ruler of FIG. 12.

FIGS. 12 and 13 illustrate yet another ruler including a chassis 31, number-carrying modules 32, 33, 34, a lens 35 and a strip of paper 36. The module 32 is an integral body of material transversely bisected by slots to define a series of movable portions. Each of the movable portions is made up by a pair of panels defined by a trio of integral hinges.

The chassis 31 has a suitable thin-walled construction and is made rigid by an arrangement of integral reinforcing ribs.

The chassis 31 is an elongate integral body and defines a long ruling edge 31a and an elongate opening 31b. The edge 31a is marked with suitable ruling markings.

The chassis 31 and module 32 include complementary engagement features by which the module 32 is retained relative to the chassis 31. In this example, the engagement features take the form of a respective elongate barb 32a running along each long side of the module 32 and dimensioned to underlie and engage a suitable lip of the chassis 31.

As the chassis 31 and module 32 are formed of separate integral bodies, they can conveniently be formed of differing materials. Advantageously, the module 32 is formed of a high grade material better suited to the conflicting demands of the durability necessary for an integral hinge and flowability in its molten state to better fill molding tools having very thin sections to define the integral hinges. On the other hand, the chassis 31 may be formed of a lower cost, lower grade material.

The modules 33, 34 carry different subsets of numerals and are formed of different colours but are otherwise identical to the module 32. In this example, the modules 32, 33, 34 respectively carry the numeral subsets 1 to 10, 11 to 20 and 21 to 30, and are formed of red, white and blue material. Visually identifying subsets of the series of symbols assists in learning. Colour coding is a preferred form of visual identification.

Optionally, the chassis 31 may define a zero portion in the form of an immovable button-like portion to the left of the "1" button.

The chassis 31 defines a shallow upwardly-open channel 37 for receiving a strip of paper 36 which may carry further symbols. By inserting the strip 36 into the channel 37, the symbols carried thereby are brought into association with the numerals carried by the modules 32, 33, 34.

In this example, the strip 36 is retained by a transparent lens 35. The lens 35 has an elongate rectangular form and a respective cylindrical spigot projecting beyond each end of one of its long edges. The chassis 31 includes bores complementary to the spigots 35a, 35b such that the lens 35 is pivotally connected to the chassis 31 to be pivotally movable from a raised strip-accessing position to a lowered strip-retaining position.

Figure 14:
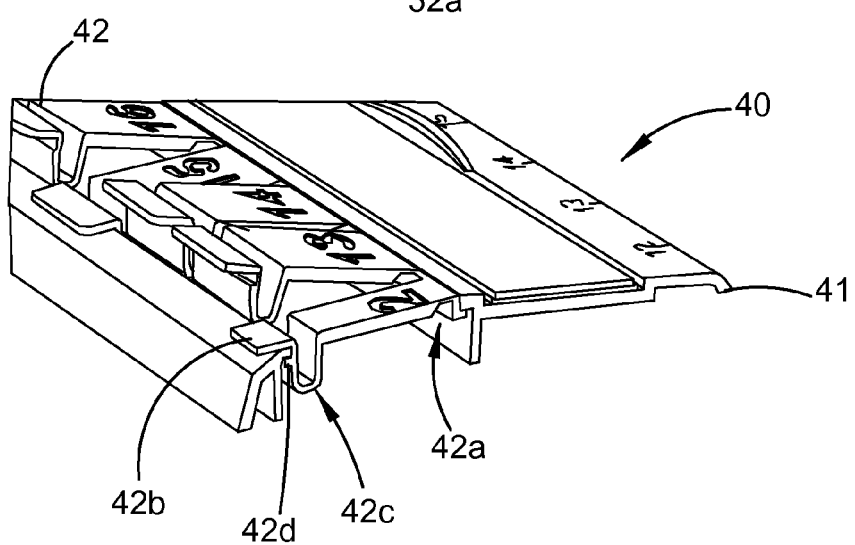
FIG. 14 is a cut-away perspective view of another ruler.

FIG. 14 illustrates an alternate form of the learning aid in which a module 42 of the movable portions is carried within a chassis 41. Each of the movable portions is pivotally mounted via an integral hinge 42a at one end and has a finger tab 42b at its other end. A U-shaped trough 42c is positioned inwards from the tab 42b and runs parallel to the axis of the integral hinge 42a. An outer wall of the trough 42c carries a locking barb 42d co-operable with a suitable lip of the chassis 41.

FIG. 14 shows movable portions carrying the numerals 13, 14 and 16 in the upward position and movable portions carrying the numerals 12 (cut-away) and 15 in their downward, selected, position. To select a numeral, the appropriate movable portion is simply depressed. An outward-inclined face of that movable portion's barb 42d acts on the lip of the chassis 41 to resiliently deform the channel section 42c. In so deforming the channel 42c is temporarily narrowed. When the barb 42d passes the lip, the barb springs outwardly under the bias of the trough 42c such that the lip is captured between the barb 42d and the tab 42b whereby the downward, selected, position is retained. This is another form of over-centre arrangement, the centre (or high energy) point being the critical point at which the barb 42d passes the lip.

To deselect a number, the tab 42b is manipulated to partly close the trough 42c and disengage the barb 42d from the lip, and to lift the movable portion.

The mode of construction of FIG. 14 advantageously allows for numerals to be selected and deselected without having to turn over the ruler to access the movable portions from the bottom.

Figure 15:
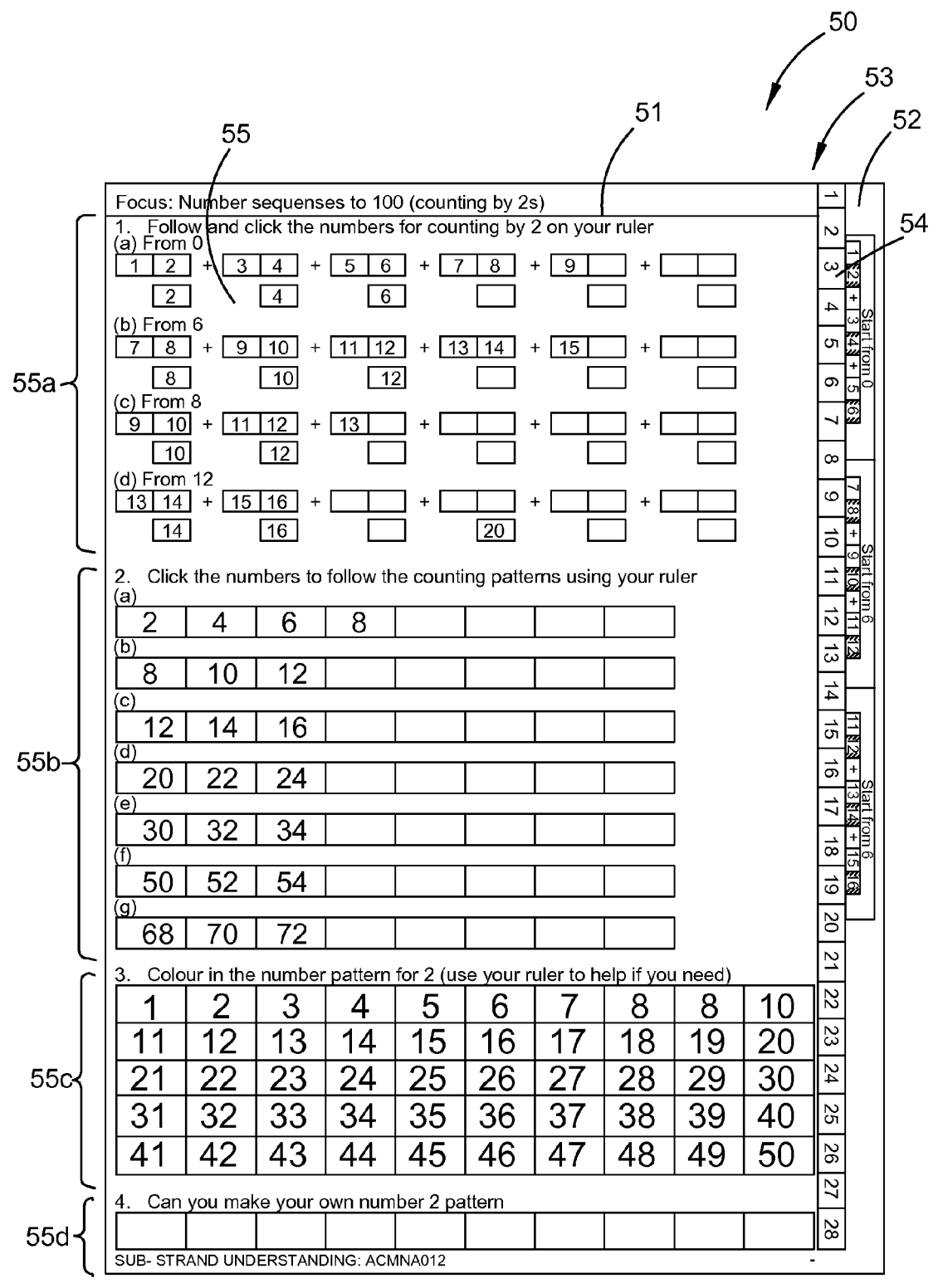

FIG. 15 illustrates a lesson plan 50 which together with a suitable learning aid constitutes a lesson set. The lesson plan 50 is formed of A4 paper, although other sizes and types of sheet material may be used. The plan 50 is in two parts, 51, 52 separated by a dividing line 53. The part 52 carries a series of symbols 54, in this example, each of the integer numerals 1 to 28 inclusive. The line 53 is preferably a line of weakness such as a line of perforations, such that the part 52 is a tear-off strip separable from the portion 51 without tools to form a strip co-operable with (for example) the aforedescribed learning aids. For example, by inserting the strip 52 into the channel 37, the symbols of the series 54 are brought into association with the ruler 31's movable portions.

Other examples of the lesson plan 50 may not include a line of weakness. By way of example, the learning aid may be used as a ruler to tear off the strip 52, in which case the plan 50 preferably includes one or more markings, e.g. a printed line, indicating where the ruler should be placed.

The sheet portion 51 includes information 55 complementary to the series 54. It is contemplated that the information 55 may be directed to one or both of a teacher and a student. In this example, information 55 takes the form of a series of lesson steps 55a, 55b, 55c, 55d directed to teaching children to count by twos. Set 55a instructs student to depress movable portions two at a time and record the latter of the depressed numbers. Learning step 55b lists a set of partially complete number series and instructs students to complete the counting patterns. Step 55c includes all of the integer numbers from 1 to 50 and instructs students to colour the number pattern for 2. Finally, step 55d simply includes a set of blank boxes in which students are instructed to make their own number 2 pattern.

It will be observed that learning steps 55a, 55b, 55c, 55d have progressively higher degrees of abstraction from the ruler. In step 55a students are told expressly which movable portions to depress. In step 55b a very similar skill is required although the explicit instruction to engage the movable portions is not given. In step 55c no number 2 pattern is given, although the integer numbers are presented for guidance. Finally, in step 55d this guidance is removed.

Whilst a simple "counting by twos" example has been given, it will be appreciated that the described lesson set becomes a powerful tool when applied to more complex series of symbols and counting concepts, e.g. to negative numbers and/or fractions, etc.

Desirably, the learning aid is of sufficiently rugged construction to survive years in a student's pencil case and stay with them during their school career. Advantageously, once students have become familiar with the rudiments of counting (and other series), the strip-receiving portion of the ruler may be conveniently used to carry reference information such as trigonomic rules, etc, such that tailored strips containing information other than symbols respectively associable with the movable portions are also contemplated.

For the avoidance of doubt, "complementary" as used herein refers to the series of symbols 54 being suitably related to the information 55. Examples of complementary series of symbols and information might include a series of fractions and a set of lesson steps akin to lesson steps 55a to 55d related to fractions, or a series of negative numbers and a set of lesson steps directed to negative numbers. Whilst information 54 in the form of instructions to students has been provided, other forms are possible. By way of example, the information 55 might include instructions to a teacher or even a simple diagram or illustration to which the teacher would talk during the lesson.

While the above description refers to various examples of the learning aid, it will be appreciated that other embodiments can be adopted by way of different combinations of features. Such embodiments fall within the spirit and scope of this invention.

Whilst a preferred simple mechanical form of the aid has been described, more elaborate variants are possible, e.g. in an electronic variant the movable portions may take the form of switches actuable to illuminate LEDs.

The invention claimed is:

1. A learning aid including:
   a series of symbols which convey at least the integer numbers from 1 to 9 inclusive; and
   an integral body of material, wherein:
   two or more portions of the integral body are movable;
   each of the movable portions is associated with at least one of the symbols and is movable by hand, independently of the other movable portions, from a first position to a second position to select, and so that the integral body stores, the at least one of the symbols;
   each of the movable portions is mounted to span a gap at least partly through which it is movable by hand from the first position to the second position; and
   each of the movable portions has a free length longer than the gap, at least partly through which it is movable, to form an over-centre arrangement separating the first position from the second position, such that a selected position of each movable portion is retained.

2. The learning aid of claim 1 wherein each respective movable portion comprises two panels hingedly connected, by integral hinges, to each other and to structure defining the gap spanned by the respective movable portion.

3. The learning aid of claim 1 wherein the symbols are Western numerals.

4. The learning aid of claim 1 being a ruler.

5. The learning aid of claim 1 including a piece carrying the symbols or further symbols and being replaceable by another piece carrying other symbols to move the other symbols into association with the movable portions.

6. The learning aid of claim 5 wherein the piece is a strip.

7. The learning aid of claim 6 including a channel for receiving the strip.

8. A learning aid including
   a series of symbols; and
   movable portions, wherein each of the movable portions:
   is associated with at least one of the symbols;
   is mounted to span a gap at least partly through which it is movable by hand, independently of the other movable portions, from a first position to a second position to select the at least one of the symbols; and
   has a free length longer than the gap, at least partly through which it is movable, to form an over-centre arrangement separating the first position from the second position, such that a selected position of each movable portion is retained.

9. The learning aid of claim 8 wherein each respective movable portion comprises two panels hingedly connected, by integral hinges, to each other and to structure defining the gap spanned by the respective movable portion.

10. The learning aid of claim 8 wherein the movable portions are portions of an integral body of material.

11. The learning aid of claim 8 wherein the symbols convey the integer numbers from 1 to 9 inclusive.

12. The learning aid of claim 8 wherein the symbols are Western numerals.

13. The learning aid of claim 8 being a ruler.

14. The learning aid of claim 8 including a piece carrying the symbols or further symbols and being replaceable by another piece carrying other symbols to move the other symbols into association with the movable portions.

15. The learning aid of claim 14 wherein the piece is a strip.

16. The learning aid of claim 15 including a channel for receiving the strip.

\* \* \* \* \*